United States Patent Office 3,095,393
Patented June 25, 1963

3,095,393
WATER-SOLUBLE COATING COMPOSITIONS COMPRISING A WATER-SOLUBLE MELAMINE FORMALDEHYDE RESIN AND A SALT OF AN ACID
Joseph Z. Matt, Chicago, Ill., assignor, by mesne assignments to Reichhold Chemicals, Inc., White Plains, N.Y., a corporation of Delaware
No Drawing. Filed Dec. 29, 1958, Ser. No. 783,116
9 Claims. (Cl. 260—21)

The present invention relates to coating systems wherein water is the solvent. When applied to our object to be coated and thereafter subjected to an elevated temperature, the coating systems convert to finishes that are resistant to water and possess desirable protective and decorative effects.

It is an advantage to use water as the solvent in a coating system rather than an organic solvent particularly in industrial finishing plants.

The use of water obviously minimizes hazards, avoids objectionable odors, simplifies clean-up and tends to lower costs. Numerous coating systems utilizing water as the solvent medium for the purpose of reducing viscosity to the consistency required for satisfactory applications have been tried in the past. Such systems have not been satisfactory for the following reasons:

Dispersions and emulsions of resinous materials are not satisfactory because adhesion to a substrate is not uniformly achieved; also when it is attempted to incorporate color pigments into a dispersion or emulsion uniform wetting is not achieved, resulting in non-uniform coatings. In addition, the surfactants required to maintain binding media suspended in water remain in the final film, resulting in a lowering of the water resistance and durability thereof.

Solutions of various resinous media in water have been suggested as coating systems. Such materials have retained water-soluble characteristics to such an extent as to preclude their practical utility.

In the practice of the invention forming the subject of the present specification, I have found a coating system which is soluble in water and which on heating converts to a coating film not affected by water. Such films are tough, adhesive and dry. The present invention thus overcomes the disadvantageous features previously inherent in water solution coatings.

A reaction product or adduct of maleic anhydride and castor oil forms one component of the system herein disclosed. Three mols of maleic anhydride may be caused to react with one mole of castor oil (castor oil being glycerine triricinoleate) in such a manner that the hydroxyls of the ricinoleic acid moieties react with the anhydride result in the attachment of maleic to castor oil thru an ester group and leave one of the maleic carboxyls present in the acid form. Castor oil having three ricinoleic acid groups will thus react with three mols of maleic anhydride. Thus, there will be produced a maleic adduct from castor oil containing three available carboxyl groups per mol.

This invention includes the conversion of the adduct of castor oil with three mols of maleic anhydride, by a further reaction with triethylamine. Such a reaction product is water soluble; when this reaction product is dissolved in water, and when a melamine-formaldehyde resin is added to the solution and an organo-metallic drier is added in a ratio sufficient to act as a siccative, then a coating resin solution results.

The coating resin solutions herein contemplated are intended for bake applications. They are not intended for air-drying usages.

The adduct of castor oil with three mols of maleic anhydride is acid in nature, having acid number in the range of 120–135. When this acidic material is reacted with triethylamine, the acidity is neutralized by means of salt formation. The product has a pH in the range of 7 to 9.

The coating resin in water solution may be directly applied to an object to be coated by brushing or spraying. The object is then baked for 15–45 minutes at temperatures in the range of 280–400° F. When such films were applied to sheet steel panels under the conditions just described, commercially acceptable clear coatings are obtained. Such clear coatings are dry and tough, adherent to the metal and not attacked by water after immersion in water at room temperature for one week.

The coating resin in water solution was stored for a period of two weeks before application on steel panels. After storage, steel panels were coated and thereafter baked for 30 minutes at 300° F. Satisfactory coatings resulted, equivalent to those made from the freshly prepared resin composition in water.

The coating resin solution above described may be pigmented with a white or colored pigment by dispersing the pigment into the liquid. Such pigmented coating systems when applied to metal objects and heated for about 30 minutes in the range of 280–400° F. produced commercially useful pigmented coatings. Such pigmented coatings are tough, abrasion resistant and not affected by immersion in water at room temperature after one week.

Having generally described the nature of my invention relative to producing a water solution and having pointed out that the system so described may be applied to a surface and be caused to cure on baking to commercially desirable coatings, I now wish to call attention to the fact that the invention encompasses a wide range in the selection of raw materials and proportions of raw materials, in addition to those materials and proportions cited in the general description immediately above.

The components of the system are—

Component (1) *Water.*—This functions as a viscosity and flow control medium.

Component (2) *Castor oil.—Maleic anhydride reaction product.*—This functions as the resinous nucleus of the system, the maleic anhydride being representative of an unsaturated dibasic acid anhydride.

Component (3) *Triethyl amine.*—The amine functions to carry the acidic castor oil derivative into water solution.

Component (4) *Organo-metallic driers.*—This type ingredient functions to cause the system to become dry when heated.

Component (5) *The melamine-formaldehyde,* being representative of a water soluble amine resin curing ingredient, functions to impart increased hardness to the final coating. The system functions completely without the presence of the melamine-formaldehyde resin. However, for purposes of improved commercial utility it is preferred to incorporate this component.

Without departing from the natural scope of the present invention, the mole ratio of unsaturated dibasic acid anhydride to castor oil may be varied within limits as shown in Table I. The systems so produced are equal in commercial utility to those detailed earlier in this specification, as Table I demonstrates.

TABLE I

| Maleic Anhydride, mols | Castor Oil, mols | Solution in Water with Tri-Ethyl Amine | Metallo-Organic Drier | Amine Resin * | Temp. of Cure, °F. | Time of Cure, min. | Film |
|---|---|---|---|---|---|---|---|
| 3 | 1 | Clear | present | none | 350 | 20 | A |
| 3 | 1 | do | do | R—10% | 350 | 20 | B |
| 2 | 1 | do | do | none | 350 | 20 | A |
| 2 | 1 | do | do | R—10% | 350 | 20 | B |
| 3 | 1 | do | do | S—5% | 350 | 20 | B |

A represents a clear hard tough dry film 1.0–1.2 mils dry film thickness on glass having a Sward hardness 18–22% of the hardness of glass.

B represents a clear hard tough dry film, 1.0–1.2 mils dry film thickness on glass, having a Sward hardness of 26–28% of the hardness of glass.

R represents a water solution of a melamine-formaldehyde resin, carrying the designation Resimene 840. The percent melamine-formaldehyde as solid resin calculated on the basis of total resin solids in the system is shown following the letter R.

S represents a water solution of a melamine formaldehyde resin carrying the designation Aerotex M–3. The percent melamine-formaldehyde as solid resin calculated on the basis of total resin solids in the system is shown following the letter S.

Without departing from the natural scope of the present invention, other unsaturated dibasic acid anhydrides may be used. I have found tetrahydrophthalic acid anhydride to be practically interchangeable with maleic anhydride for purposes of this invention. The following unsaturated dibasic acid anhydrides did not function properly in the system: Chloromaleic anhydride, citraconic anhydride and methyl nadic anhydride.

The present invention contemplates the conversion of a castor oil-dibasic acid anhydride reaction product into a water-soluble amine derivative, triethylamine being representative of numerous amines functioning to cause water solubility within the scope of the present invention. The following amines function practically interchangeably with triethylamine as ingredients of the coating system of the present invention: trimethylamine, ammonia, diethanolamine and triethanolamine.

Without departing from the scope of the present invention, the ratio of amine to the reaction product of castor oil and unsaturated dibasic acid anhydride may be varied within the limits of (a) One mole of amine for each available carboxyl group, and
(b) Two mols of amine for each available carboxyl group.

As pointed out above, the coating systems of the present invention function with or without the addition of water-soluble melamine-formaldehyde resins. Melamine-formaldehyde resins are desirable for increasing the hardness of the resinous films. Melamine-formaldehyde resins may be used with the other non-volatile ingredients of the system in the ratio of zero to 50% of melamine resin. A number of different melamine resins function satisfactorily as can be seen from Table I. Melamine-formaldehyde resins also contribute a means of adjusting viscosity.

The coating resin solution may be pigmented with white pigments in order to produce white coatings. The coating resin solution may be compounded with chemical colors to produce colored enamels and primers.

Where desirable, the coating resin solution may be blended or extended with other coating systems; particularly it may be blended with butadiene-styrene latices.

The coating resin solution and compounded and pigmented derivatives thereof may be applied to surfaces by any conventional application method such as brushing, spraying, roller coating or dipping.

As understood by those experienced in the art, driers may be adjusted to the practical conditions involved at the site of application. The system of the present invention converts to water-insoluble films in the absence of driers; I prefer to use driers in order to accelerate the conversion.

*Example I*

1250 grams of castor oil was mixed with 355 grams of maleic anhydride. The mixture was blanketed with an inert gas and heated at 300° F. with agitation. Acid numbers were determined on the mixture at half hour intervals. The heating was stopped when an acid number of 127 was reached.

The castor-oil maleic anhydride reaction product thus produced had the following characteristics:

Acid value _____ 127
Viscosity (Gardner-Holdt) _____ $Z_3$–$Z_4$
Color (Gardner 1933 standards) _____ 2

To the above product, 3994 grams of water and 392 grams of triethylamine were added and the mixture stirred at room temperature. An amine salt was thus formed. Thereafter 6.56 grams of cobalt naphthenate solution (containing 6% cobalt metal by weight)
6.56 grams of manganese naphthenate solution (containing 6% manganese metal by weight)
3.82 grams of lead naphthenate solution (containing 24% lead metal by weight)

were added with stirring.

The coating material solution was thus formed (designated hereinafter as coating solution A).

The solution possessed the following characteristics (coating solution A):

pH _____ 8.7.
Gardner 1933 color _____ 4–5.
Gardner-Holdt viscosity _____ Y–Z at 77° F.
Solids _____ 33.3%.
Weight per gallon _____ 8.35 pounds.

When the solution was applied to a glass plate at a wet film thickness of three mils and baked for 30 minutes at 350° F. a tough, dry, hard, clear film resulted. This had a hardness when measured by the Sward hardness rocker equal to 20% of the hardness of glass.

When the solution was applied to a tin plate and baked for 20 minutes at 350° F. a tough, dry, adherent film was formed. An area on the tin plate having a dry film thickness of 1.0 mil was tested on the General Electric distensibility tester. It was found to withstand 20% elongation without cracking.

Coating solution A was modified with a melamine-formaldehyde resin to form coating solution B as follows:

2250 grams of solution A
120 grams of a melamine-formaldehyde resin solution "Resimene 840"
132 grams of water The above ingredients were mixed to a uniform solution. Coating solution A was modified with a melamine-formaldehyde resin to form coating solution C as follows:

1998 grams of solution A
240 grams of a melamine-formaldehyde resin solution "Resimene 840"
132 grams of water The above ingredients were mixed to a uniform solution. The constants on the three coating solutions thus produced were:

|  | Coating Solution A | Coating Solution B | Coating Solution C |
|---|---|---|---|
| Solvent | Water | Water | Water |
| Solids, percent | 33 | 33 | 33 |
| Percent Melamine Resin on solids | 0 | 10 | 20 |
| Viscosity-Gardner-Holdt | Y–Z | U–V | E–F. |
| Color Gardner 1933 | 4-5 | 4-5 | 4-5 |

Eight pigmented coating products were made by grinding pigments into the coating solutions by means of a three-roller paint-mill. The pigment coatings were made on the following schedule of compositions:

| Pigmented Coating Material Number | 1 | 2 | 3 | 4 | 5 | 6 | 7 | 8 |
|---|---|---|---|---|---|---|---|---|
| Coating Solution Type | A | B | C | A | B | C | B | B |
| Grams of Coating Solution | 418 | 418 | 418 | 418 | 418 | 418 | 418 | 418 |
| Grams of: Pure Titanium Dioxide | 100 | 100 | 100 | 100 | 100 | 100 | 100 | 100 |
| Micronized Silica | 0 | 0 | 0 | 150 | 150 | 150 | 0 | 0 |
| Asbestine | 0 | 0 | 0 | 0 | 0 | 0 | 150 | 0 |
| Barium Sulphate | 0 | 0 | 0 | 0 | 0 | 0 | 0 | 150 |

The coating solutions thus produced smooth homogeneous pigmented systems. The pigmented systems were reduced with water to spray viscosity and sprayed on steel panels. The panels were then baked at 350° F. for 20 minutes.

In all cases smooth even uniform coatings resulted. The pigmented coatings were recoated with the same system as previously applied to each panel. On baking at 350° F. for 30 minutes, smooth, even hard coatings resulted. One-half of each panel was then sprayed with a conventional alkyd automotive enamel. This treatment resulted in a smooth even film. The alkyd automotive enamel did not cause lifting of the undercoat or in any manner mar the film deposited from the water solution. All of the surfaces of the eight paneled panels were scored with a stylus so as to leave a line of metal exposed and free of the coating. The panels were immersed in tap water at room temperature. After eight days the panels were inspected, with results as tabulated below. The panels were again placed in water and observed after one month, with results tabulated below.

Observations apply to system deposited from water medium, not to the alkyd enamel which covered a portion of the panel.

ONE WEEK IMMERSION

| Pigmented Coating Material Number | 1 | 2 | 3 | 4 | 5 | 6 | 7 | 8 |
|---|---|---|---|---|---|---|---|---|
| Rust Creepage at Score | 0 | 0 | 0 | 0 | 0 | 0 | 0 | 0 |
| Effect of water on on surface of film | 0 | 0 | 0 | 0 | 0 | 0 | 0 | 0 |
| Softening of film | 0 | 0 | 0 | 0 | 0 | 0 | 0 | 0 |

ONE MONTH IMMERSION

| | 1 | 2 | 3 | 4 | 5 | 6 | 7 | 8 |
|---|---|---|---|---|---|---|---|---|
| Rust creepage at score, inches | 1/16 | 1/16 | 1/16 | 1/8 | 1/8 | 1/8 | 1/16 | 1/8 |
| Effect of water on surface of film | 0 | 0 | 0 | MB | RP | 0 | MB | 0 |
| Softening of film | 0 | 0 | 0 | 0 | 0 | 0 | 0 | S.S. |

MB—minute blisters; RP—rust spots in blisters; S.S.—slightly softened.

Example II

CASTOR OIL DIMALEATE OR GLYCEROL MONO-RICINOLEATE BIS (MALEYL RICINOLEATE)

Castor oil (200 grams) and maleic anhydride (38 grams) were heated at 300° F. till the acid number was reduced to 91.8. An amber oil of $Z_4$ viscosity and 8 color was obtained.

A 33% solution in water had a viscosity of "C" as measured by the Gardner-Holdt viscosity standards. When deposited as a film on glass at 3 mils wet film thickness, and baked at 350° for 30 min., it gave a film of 6 Sward hardness compared to glass as 100.

Example III

TRIETHYLAMINE SALT OF THE PRODUCT OF EXAMPLE II

The product of II (25 grams) and triethylamine (4.1 grams) were dissolved with shaking in 87 grams of water to give a thick solution. When deposited on glass as a film 3 mils wet thickness at 350° for 20 min., it gave a film of 16 Sward hardness.

Example IV

MELAMINE-FORMALDEHYDE RESIN WITH PRODUCT OF EXAMPLE III

Thirty grams of the salt solution of Example III was mixed with 1.43 grams of Resimene 840, a melamine-formaldehyde resin (70% solids). The resulting clear solution had a U–V viscosity. With driers added and cast as a film on glass and baked at 350° for 30 minutes, it gave a film of 20 Sward hardness. Similarly on tin plate, a film was obtained which passed 20% elongation on the General Electric testmeter.

I claim:

1. An article having a coating formed by producing a salt of an acid, said acid being formed by reacting the hydroxyl groups of one mole of glyceryl triricinoleate with 2 to 3 moles of dibasic acid anhydride selected from the group consisting of maleic anhydride and tetrahydrophthalic anhydride, said anhydride being used in such ratio to hydroxyl that one ester linkage and one carboxyl remain per mole of dibasic anhydride used, said salt being formed by neutralization of said acid with an agent selected from the group consisting of ammonia, trimethylamine, triethylamine and an ethanolamine, thereafter adding a water-soluble melamine-formaldehyde resin, a metallic organic drier, and a pigment, followed by subjecting the resulting composition to dissolution in water, applying the resulting aqueous composition to a surface of an article, and baking at 300° to 350° F. for 20 to 25 minutes.

2. A water-soluble coating composition comprising water-soluble salt of an adduct at hydroxyl positions of one mole of castor oil with from 2 to 3 moles of a dibasic acid selected from the group consisting of maleic anhydride and tetrahydrophthalic anhydride, said adduct being an acid-ester at the location of the —OH group of a fatty acid radical of the castor oil, said salt being formed by neutralization of said adduct with an agent selected from the group consisting of ammonia, trimethylamine, triethylamine and an ethanolamine, and water-soluble melamine-formaldehyde resin, the said non-aqueous components of said composition being capable of thermal curing to form a water-insoluble resin.

3. A water-soluble coating composition according to claim 2 in which the selected agent is triethylamine.

4. A water-soluble coating composition comprising water-soluble salt of an adduct at hydroxyl positions of one mole of castor oil with from 2 to 3 moles of maleic anhydride, said adduct being an acid-ester at the location of the —OH group of a fatty acid radical of the castor oil, said salt being formed by neutralization of said adduct with an agent selected from the group consisting of ammonia, trimethylamine, triethylamine, and an ethanolamine, and water-soluble melamine-formaldehyde resin, the said non-aqueous components of said composition being capable of thermal curing to form a water-insoluble resin.

5. A water-soluble coating composition according to claim 4 in which the selected agent is triethylamine.

6. A water-soluble coating composition comprising water-soluble salt of an adduct at hydroxyl positions of one mole of castor oil with from 2 to 3 moles of a dibasic acid anhydride selected from the group consisting of maleic anhydride and tetrahydrophthalic anhydride, water-soluble melamine-formaldehyde resin, water, said adduct being an acid-ester at the location of the —OH group of a fatty acid radical of the castor oil, and metallic organic drier, said salt being formed by neutralizing said adduct with an agent selected from the group consisting of ammonia, trimethylamine, triethylamine and an ethanolamine, the said non-aqueous components of said composition being capable of thermal curing to form a water-insoluble resin.

7. A water-soluble coating composition comprising water-soluble salt of an adduct at hydroxyl positions of one mole of castor oil with from 2 to 3 moles of a dibasic acid anhydride selected from the group consisting of maleic anhydride and tetrahydrophthalic anhydride, water-soluble melamine-formaldehyde resin, water, said adduct being an acid-ester at the location of the —OH group of a fatty acid radical of the castor oil, pigment, and metallic organic drier, said salt being formed by neutralizing said adduct with an agent selected from the group consisting of ammonia, trimethylamine, triethylamine and an ethanolamine, the said non-aqueous components of said composition being capable of thermal curing to form a water-insoluble resin.

8. A water-soluble coating composition comprising water-soluble salt of an adduct at hydroxyl positions of one mole of castor oil with from 2 to 3 moles of maleic anhydride, said adduct being an acid-ester at the location of the —OH group of a fatty acid radical of the castor oil, water-soluble melamine-formaldehyde resin, water, and metallic organic drier, said salt being formed by neutralizing said adduct with an agent selected from the group consisting of ammonia, trimethylamine, triethylamine and an ethanolamine, the said non-aqueous components of said composition being capable of thermal curing to form a water-insoluble resin.

9. A water-soluble coating composition comprising water-soluble salt of an adduct at hydroxyl positions of one mole of castor oil with from 2 to 3 moles of maleic anhydride, said adduct being an acid-ester at the location of the —OH group of a fatty acid radical of the castor oil, water-soluble melamine-formaldehyde resin, water, pigment, and metallic organic drier, said salt being formed by neutralizing said adduct with an agent selected from the group consisting of ammonia, trimethylamine, triethylamine and an ethanolamine, the said non-aqueous components of said composition being capable of thermal curing to form a water-insoluble resin.

References Cited in the file of this patent

UNITED STATES PATENTS

| | | |
|---|---|---|
| 2,396,763 | Ullman | Mar. 19, 1946 |
| 2,502,606 | Ullman | Apr. 4, 1950 |
| 2,551,352 | Tawney | May 1, 1951 |
| 2,681,322 | Auer | June 15, 1954 |
| 2,695,909 | Smith | Nov. 30, 1954 |
| 2,785,383 | Foster | Mar. 12, 1957 |
| 2,852,476 | Cummings | Sept. 16, 1958 |
| 2,853,459 | Christenson et al. | Sept. 23, 1958 |
| 2,874,175 | Feuge et al. | Feb. 17, 1959 |